(12) United States Patent
Wintzer et al.

(10) Patent No.: US 9,732,924 B2
(45) Date of Patent: *Aug. 15, 2017

(54) HEADLIGHT LENS FOR A VEHICLE HEADLIGHT

(71) Applicant: DOCTER OPTICS SE, Neustadt an der Orla (DE)

(72) Inventors: Wolfram Wintzer, Jena (DE); Hans Scheibner, Neustadt (DE); Hagen Goldammer, Jena (DE)

(73) Assignee: Docter Optics SE, Neustadt an der Orla (DE)

( * ) Notice: Subject to any disclaimer, the term of this patent is extended or adjusted under 35 U.S.C. 154(b) by 254 days.

This patent is subject to a terminal disclaimer.

(21) Appl. No.: 14/442,041

(22) PCT Filed: Oct. 1, 2013

(86) PCT No.: PCT/EP2013/002943
§ 371 (c)(1),
(2) Date: May 11, 2015

(87) PCT Pub. No.: WO2014/114307
PCT Pub. Date: Jul. 31, 2014

(65) Prior Publication Data
US 2015/0369436 A1 Dec. 24, 2015

(30) Foreign Application Priority Data

Jan. 23, 2013 (DE) .................. 10 2013 001 074
Aug. 21, 2013 (DE) .................. 10 2013 013 995

(51) Int. Cl.
*F21V 5/00* (2015.01)
*F21S 8/10* (2006.01)
*G02B 19/00* (2006.01)

(52) U.S. Cl.
CPC ....... *F21S 48/1216* (2013.01); *F21S 48/1291* (2013.01); *G02B 19/0014* (2013.01); *G02B 19/0047* (2013.01)

(58) Field of Classification Search
CPC . F21S 48/1159; F21S 48/1241; F21S 48/1291
(Continued)

(56) References Cited

U.S. PATENT DOCUMENTS

2002/0057577 A1* 5/2002 Oschmann .......... F21S 48/1258
362/507
2007/0120137 A1 5/2007 Wilson et al.
2015/0300587 A1* 10/2015 Scheibner ............ F21S 48/1159
362/520

FOREIGN PATENT DOCUMENTS

DE 4320554 12/1993
DE 10252228 8/2003
(Continued)

OTHER PUBLICATIONS

International Search Report and Written Opinion, Application No. PCT/EP2013/002943, dated Apr. 4, 2014.
(Continued)

*Primary Examiner* — Ahshik Kim
(74) *Attorney, Agent, or Firm* — Barnes & Thornburg LLP

(57) ABSTRACT

The invention relates to a headlamp lens for a vehicle headlamp, in particular a motor vehicle headlamp. The headlamp lens comprises a body made of a transparent material and having at least one light inlet surface and at least one optically effective light exit surface. The body comprises a light tunnel which transitions into a light-conducting element while making a bend for imaging the bend as a light-shadow line. The body further comprises an orientation structure for orienting the headlamp lens in a
(Continued)

vehicle headlamp and/or for orienting the headlamp lens towards a light source for irradiating light onto the light inlet surface.

33 Claims, 9 Drawing Sheets

(58) Field of Classification Search
USPC .......................................................... 362/520
See application file for complete search history.

(56) References Cited

FOREIGN PATENT DOCUMENTS

| DE | 102004005931 | 8/2004 |
|----|--------------|--------|
| DE | 102005009556 | 9/2005 |
| DE | 102004043706 | 4/2006 |
| DE | 102007052696 | 7/2008 |
| DE | 102011118277 | 9/2010 |
| EP | 1630576 | 3/2006 |
| EP | 1514148 | 1/2008 |
| EP | 1903275 | 3/2008 |
| EP | 2390561 | 11/2011 |
| WO | 2006041331 | 4/2006 |
| WO | 2009109209 | 9/2009 |
| WO | 2012072188 | 6/2012 |
| WO | 2012072189 | 6/2012 |
| WO | 2012072191 | 6/2012 |
| WO | 2012072192 | 6/2012 |
| WO | 2012072193 | 6/2012 |

OTHER PUBLICATIONS

International Search Report and Written Opinion, Application No. PCT/EP2013/002437, dated Jan. 21, 2014.
Office Action issued on Jun. 27, 2013 in German Application No. 102012021797.8.
International Preliminary Report on Patentability, Application No. PCT/EP2013/002943, dated Jul. 28, 2015.
English translation of International Preliminary Report on Patentability, Application No. PCT/EP2013/002943, dated Jul. 28, 2015.

\* cited by examiner

HEADLIGHT LENS FOR A VEHICLE HEADLIGHT

CROSS REFERENCE TO RELATED APPLICATIONS

This application is a U.S. nationalization under 35 U.S.C. §371 of International Application No. PCT/EP2013/002943, filed Oct. 1, 2013, which claims priority to German Application No. 102013001074.8, filed Jan. 23, 2013 and German Application No. 102013013995.3, filed Aug. 21, 2013.

FIELD OF THE INVENTION

The invention refers to a headlight lens for a vehicle headlight, in particular for a motor vehicle headlight, wherein the headlight lens includes a monolithic body of transparent material, including at least one light entry face and at least one optically effective light exit face. The invention also refers to a vehicle headlight.

BACKGROUND INFORMATION

WO 2012/072188 A1 discloses a headlight lens for a motor vehicle headlight, wherein the headlight lens includes a body of transparent material, including at least one (in particular optically effective light entry face and at least one optically effective light exit face, and wherein the body comprises a light tunnel which, via a bend, forms a transition into a light passage section for imaging the bend as a bright-dark-boundary

SUMMARY

According to an aspect of the invention headlight lens for a vehicle headlight, e.g. for a motor vehicle headlight, includes an optionally press-molded, in particular monolithic body of transparent material, including at least one in particular optically effective light entry face and at least one optically effective light exit face, and wherein the body comprises a light tunnel which, via a bend, forms a transition into a light passage section for imaging the bend as a bright-dark boundary, and wherein the in particular monolithic body includes a alignment structure for aligning the headlight lens in a vehicle headlight and/or for aligning the headlight lens with respect to a light source for making light enter (or for irradiating light into) the light entry face.

Herein, the alignment of the headlight lens, e.g., occurs in that, via the alignment structure, a part or section of the housing is aligned, which section mechanically connects headlight lens to the light source. An alignment structure may be or include a composition or attachment element or a composition or attachment structure or a composition or attachment face, respectively, for the corresponding housing section. A housing section is, in particular, an element or structural component which mechanically connects the headlight lens to the light source.

An optically effective (or operative) light entry (sur-)face and/or an optically effective light exit (sur-)face, respectively, is/are an optically effective surface of the monolithic body. An optically effective surface is, in particular, a surface of the transparent body, at which surface, when using the headlight lens according to its purpose, the light will be refracted. An optically effective surface is, in particular, a surface at which, when using the headlight lens according to its purpose, the direction of light which passes through this surface will be changed.

Transparent material is in particular glass. Transparent material, is particularly inorganic glass. Transparent material is for example silicate glass. Transparent material is for example glass as described in PCT/EP2008/010136. Glass for example comprises
  0.2 to 2% by weight $Al_2O_3$,
  0.1 to 1% by weight $Li_2O$,
  0.3, in particular 0.4 to 1.5% by weight $Sb_2O_3$,
  60 to 75% by weight $SiO_2$,
  3 to 12% by weight $Na_2O$,
  3 to 12% by weight $K_2O$, and
  3 to 12% by weight $CaO$.

The term press-molding (also termed bright-pressing, blank-molding or blank-pressing, in technical and patent literature) is, in particular, to be understood in a manner that a (in particular optically effective) surface is subjected to pressure such that any subsequent finishing or post-treatment of the contour of this (in particular optically effective) surface may be dispensed with, or does not apply, or will not have to be provided for, respectively. Consequently, it is for example provided for that, after press-molding, such a press-molded surface will not be ground, (i.e. it will not [have to] be treated by grinding).

A light tunnel is, in particular, characterised in that essentially total reflection will occur at its lateral (e.g. at the top, at the bottom, on the right and/or on the left) surfaces, so that light entering through the light entry face is conducted through the tunnel acting as a light guide (conductor). A light tunnel is, in particular, a light guide or light conductor. In particular, it is provided for that total reflection will occur at longitudinal surfaces of the light tunnel. In particular, it is provided for that longitudinal surfaces of the light tunnel are destined for total reflection. In particular, it is provided for that total reflection will be achieved along the surfaces of the light tunnel essentially orientated in the direction of the optical axis of the light tunnel. In particular, it is provided for that the surfaces of the light tunnel essentially orientated in the direction of the optical axis of the light tunnel are destined for total reflection. A light tunnel will, for example, taper in the direction towards its light entry face. A light tunnel will, for example, taper in the direction towards its light entry face by at least 3°. A light tunnel will, for example, taper in the direction of its light entry face by at least 3° with respect to its optical axis. A light tunnel will, for example, taper at least partially in the direction towards its light entry face. A light tunnel will, for example, taper at least partially in the direction of its light entry face by at least 3°. A light tunnel will, for example, taper at least partially in the direction of its light entry face by at least 3° with respect to its optical axis. Supplementaly, multiple light tunnels may be provided for as well, as are described in WO 2012/072188 A1 (cf. FIGS. 14, 15, 16, and 17 of WO 2012/072188 A1) or claimed therein, respectively.

A bend is, in particular, a curved transition. A bend is, in particular, a curved transition having a radius of curvature of no less than 50 nm. In particular, it is provided for that the surface of the headlight lens has no break or discontinuity in the bend, but rather a curve (or curvature). In particular, it is provided for that the surface of the headlight lens, in the bend, has a curvature, in particular having a radius of curvature of the curve, in the bend, of no less than 50 nm. In an embodiment, the radius of curvature is no larger than 5 mm. In an embodiment, the radius of curvature is no more than 0.25 mm, e.g., no more than 0.15 mm, for example no more than 0.1 mm. In a further embodiment of the invention, the radius of curvature of the curve, in the bend, is at least 0.05 mm. In particular, it is provided for that the surface of the headlight lens is press-molded in the region of the bend.

In a further embodiment of the invention a first straight line intersects a second straight line by an angle, which, when looking onto the headlight lens in a manner in which the light passage section lies to the right of the light tunnel, amounts to 1° up to 10°, when viewed in a clockwise direction starting from the first straight line, wherein the first straight line is
- the optical axis or an optical axis, respectively, of the light passage section and/or the optical axis or an optical axis, respectively, of the light exit face and/or
- the projection of the optical axis or an optical axis, respectively, of the light passage section onto a vertical plane and/or the projection of the optical axis or an optical axis, respectively, of the light exit face onto the vertical plane, and wherein the second straight line is
- the optical axis or an optical axis, respectively, of the light tunnel and/or
- the projection of the optical axis or an optical axis, respectively, of the light tunnel onto the vertical plane.

In this context, it is, for example, provided for that the performance of irradiation of the light which enters the headlight lens through the light entry face and exits from the light exit face (for imaging the bend as a bright-dark boundary) amounts to at least 80%, for example to at least 88%, for example up to 95% of the irradiation performance of the light which enters the headlight lens through the light entry face.

In a further embodiment of the invention, the light tunnel comprises an area on its surface which essentially corresponds to part of the surface of an ellipsoid. In a further embodiment of the invention, a first straight line intersects a second straight line by an angle which, when looking at that headlight lens in a manner/way in which the light passage section lies to the right of the light tunnel, amounts to 1° up to 10°, wherein the first straight line is
- the optical axis or an optical axis, respectively, of the light passage section and/or the optical axis or an optical axis, respectively, of the light exit face and/or
- the projection of the optical axis or an optical axis, respectively, of the light passage section onto the vertical plane and/or the projection of the optical axis or an optical axis, respectively, of the light exit face onto the vertical plane, and wherein the second straight line is
- the optical axis or an optical axis, respectively, of the light tunnel and/or a straight line through the two focal points of the ellipsoid and/or
- the projection of the optical axis or an optical axis, respectively, of the light tunnel onto the vertical plane and/or the projection of a straight line through the two focal points of the ellipsoid onto the vertical plane.

In this context, it is, for example, provided for that the performance of irradiation of the light which enters the headlight lens through the light entry face and exits from the light exit face (for imaging the bend as a bright-dark boundary) amounts to at least 80%, for example to at least 88%, for example up to 95% of the irradiation performance of the light which enters the headlight lens through the light entry face.

A vertical plane is, in particular, a plane in the direction of the optical axis of the light exit face and/or of the optical axis of the light passage section. The focal points of the ellipsoid are the focuses thereof. The points F1 and F2 in FIG. 8 and FIG. 9 are to be taken as examples for the focal points of an ellipsoid.

In an embodiment of the invention, the point of intersection of the first straight line with the second straight line is provided for (arranged) in the bend and/or in the transition from the light tunnel to the light passage section.

In a further embodiment of the invention, the light tunnel includes a transitional area, arranged between an ellipsoid-configured region and the light passage section, in which the surface (of the light tunnel) restricting the light tunnel in an upward direction rises in the direction towards the light passage section, and/or in which area the surface (of the light tunnel) restricting the light tunnel in an upward direction has a point of inflection, and/or in which area the surface (of the light tunnel) restricting the light tunnel in an upward direction has a concavely curved region, for example having a radius of curvature of at least 10 mm, for example having a radius of curvature of at least 20 mm. The transition from the ellipsoid-configured region of the surface restricting the light tunnel upwardly into the transitional area may occur via a press-molded bend.

In a further embodiment of the invention, the alignment structure is arranged on a surface of the light passage section facing the light tunnel. In a further embodiment of the invention, the alignment structure comprises at least one ball-shaped segment. In a further embodiment of the invention, the alignment structure comprises at least two, for example at least three ball-shaped segments. In a further embodiment of the invention, the alignment structure comprises at least one bore, at least one hole, at least one notch and/or at least one (in)dent. A dent or indent can, for example, be a negative contour of a ball-shaped segment. In a further embodiment of the invention, the alignment structure comprises at least one cone. A cone can, for example, well be a partially circumferential cone, as, for example, is being shown in FIG. 16. A cone for example comprises an axis which extends, essentially or approximately, in parallel to the optical axis of the light tunnel or to the optical axis of the light exit face or of the light passage section, respectively. A cone may comprise several partial elements of a cone which are separate(d) from one another. In a further embodiment of the invention, the alignment structure comprises an inclined face. In a further embodiment of the invention, the alignment structure comprises at least two, for example at least three inclined faces. An inclined face may also be a partial element of a cone.

In a further embodiment of the invention, the headlight lens comprises a flange. The flange may be circumferential, however, the flange may also be configured in an interrupted manner. A flange is, for example, arranged completely or partially surrounding the light passage section. In an embodiment of the invention, the flange, at least partially, restricts the light exit face.

In a further embodiment of the invention, the light exit face is configured to be segmented. In a further embodiment of the invention, the light exit face comprises at least three segments, which are separated from one another, for example via of a notch or a bend.

In a further embodiment of the invention, the light tunnel is arranged between the bend and the light entry face. In a further embodiment of the invention, the light passage section is arranged between the bend and the light exit face. It is, for example, provided for that light entering the transparent body through the light entry face and entering the passage section from the light tunnel in the region of the bend, will exit from the light exit face at an angle of between −30° and 30° with respect to the optical axis. It is, for example, provided for that light entering the transparent body through the light entry face, will exit from the light exit face at an angle of between −30° and 30° relative to the optical axis. It is, for example, provided for that light entering the transparent body through the light entry face and, from the light tunnel, entering the passage section in the area of the bend, will exit from the light exit face essentially in parallel relative to the optical axis. It is, for example, provided for that light entering the transparent body through the light entry face, will exit from the light exit face essentially in parallel relative to the optical axis.

In a further embodiment of the invention, the bend includes an opening angle of at least 90°. In a further embodiment of the invention, the bend includes an opening angle of no more than 150°. In a further favourable embodiment of the invention, the bend is arranged on a surface of the light passage section, which surface is facing the light entry (sur)face.

In a further embodiment of the invention, the orthogonal of the light entry face is inclined with respect to the optical axis of the light passage section and/or of the light tunnel. In a further embodiment of the invention, the light entry face is inclined with respect to the optical axis of the light passage section and/or of the light tunnel by an angle of between 5° and 70°, for example by an angle of between 20 end 50°.

In a further embodiment of the invention, the light tunnel comprises a region on its surface which region corresponds essentially to at least 15% of the surface of an ellipsoid.

In a further embodiment of the invention, a surface of the light passage section facing the light tunnel is curved, for example convexly, at least in the region of the bend towards the transition into the light tunnel. In a further embodiment of the invention, the bend is curved in its longitudinal extension. In a further embodiment of the invention, the bend is curved in its longitudinal extension with a radius of curvature of between 5 mm and 100 mm. In a still further embodiment of the invention, the bend is curved, in its longitudinal extension, corresponding to a Petzval curve.

In a further embodiment of the invention, the bend comprises, in its longitudinal extension, a curvature having a radius of curvature in the orientation of the optical axis of the light tunnel and/or of the light passage section. In a yet further embodiment of the invention, the radius of curvature is orientated opposite to the light exit face.

In a further embodiment of the invention, the bend is curved in a first direction and in a second direction. In a further embodiment of the invention, the first direction is orthogonal with respect to the second direction. In a still further embodiment of the invention, the bend is curved with a first radius of curvature in a first direction and with a second radius of curvature in a second direction, wherein the second radius of curvature is orthogonal with respect to the first radius of curvature.

In a further embodiment, a portion of the surface of the passage section facing the light tunnel is configured as a Petzval (sur)face. In a yet further embodiment of the invention the surface of the light passage section facing the light tunnel is, in a region in which it forms a transition into the light tunnel, configured as a Petzval face.

In a further embodiment of the invention the length of the headlight lens, when viewed in the orientation of the optical axis of the light tunnel and/or of the light passage section, amounts to no more than 8 cm.

It can be provided for that a headlight lens may include a notched or indented light passage section as is being disclosed, for example, in FIG. 11 of WO 2012/072189 A2.

According to another aspect of the invention a vehicle headlight, e.g. a motor vehicle headlight, includes a headlight lens, or example comprising one or several of the aforementioned features, a light source for making light enter the light entry face of the headlight lens, as well as a housing portion for mechanically connecting the alignment structure to the light source. In a further embodiment of the invention, the light source comprises at least one LED or an array of LEDs. In an embodiment of the invention, the light source comprises at least one OLED or an array of OLEDs. For example, the light source may be a planar luminous field, as well. The light source may also comprise light element chips as have been disclosed in DE 103 15 131 A1. A light source may as well be a laser. A suitable laser is being disclosed in ISAL 2011 Proceedings, pages 271ff. In a further embodiment of the invention, the radiation performance of the light, which enters the headlight lens through the light entry face and exits from the light exit face (for imaging the bend as a bright-dark boundary) amounts to at least 70%, for example to at least 75% of the radiation performance of the light emitted from the light source.

In a further embodiment of the invention the vehicle headlight has no secondary optic associated with the headlight lens. A secondary optic is, for example, an optic for aligning light which exits from the light exit face or from the last light exit face of the headlight lens, respectively. A secondary is, for example, an optical element for aligning light, said optical element being separated from and/or subordinated with regard to the headlight lens. A secondary optic is, for example, no cover nor a protection disc, respectively (but an optical element provided for aligning light). An example of a secondary optic is e.g. a secondary lens as is being disclosed in DE 10 2004 043 706 A1.

It is, for example, provided for that the bend which is being imaged as a bright-dark boundary lies in the lower region of the light tunnel.

In a yet further embodiment of the invention the distance of the light source from the centre of the light exit face, when viewed in the orientation of the optical axis of the light tunnel and/or of the light passage section, amounts to no more than 10 cm. In a further embodiment of the invention the length of the vehicle headlight, when viewed in the orientation of the optical axis of the light tunnel and/or of the light passage section, amounts to no more than 10 cm.

One or several further light sources may be provided for, whose light is irradiated into or made to enter, respectively, the passage section and/or a part of the light tunnel, for implementing sign light, long distance light, and/or cornering light. When making such additional light enter the light tunnel, it is, for example, provided for that this occurs in that half of the light tunnel which is closer to the light passage section and/or in which the light entry face is not provided for. For example, additional light source arrays may be provided for as are being described or claimed, respectively, in WO 2012/072192 A1. For example, additional light source arrays are specified in FIGS. 10, 14, 15, 18, 19, 20, and 21 of WO 2012/072192 A1. For example, the headlight lens according to the invention may be used in arrays having optical axes inclined with respect to each other, as is being disclosed, for example, in WO 2012/072193 A2, for example in FIG. 24 of WO 2012/072193 A2. Moreover, or alternatively in respect thereof, it may be provided for that the headlight lens, according to the invention, will be made use of in vehicle configurations as are being disclosed or claimed, respectively, in WO 2012/072191 A2.

In a further embodiment of the invention, the light source and the light entry face are configured and arranged with respect to each other such that light from the light source will enter the light entry face at a luminous flux density of at least 75 lm/mm².

The aforementioned headlight lenses may be manufactured via a process as is being described in WO 2012/072188 A1.

It can be provided for that a light entry face and/or a light exit face includes/include a light dispersing structure. A light dispersing structure may, for example, be a structure as is being disclosed in DE 10 2005 009 556 A1 and in EP 1 514 148 A1 or in EP 1 514 148 B1, respectively. It can be provided for that a light tunnel is coated. It can be provided for that a light tunnel is coated with a reflecting coating. It can be provided for that a mirroring coating is applied to a light tunnel. Such a coating is, however, not necessary, and may be a less embodiment.

The invention provides for an improved vehicle headlight, in particular an improved motor vehicle headlight, e.g. in terms of having an improved light distribution.

A motor vehicle is, in particular, a land vehicle for individual use in road traffic. In the sense of the invention, motor vehicles are, in particular, not restricted to land vehicles including a combustion engine.

DETAILED DESCRIPTION

Figure 1:
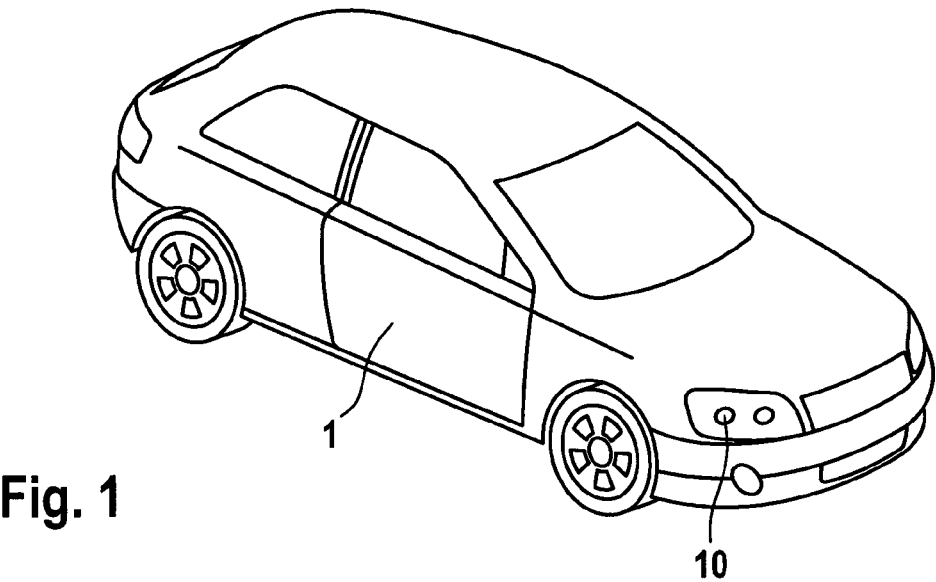
FIG. 1 shows an example of an embodiment of a motor vehicle.
Figure 2:
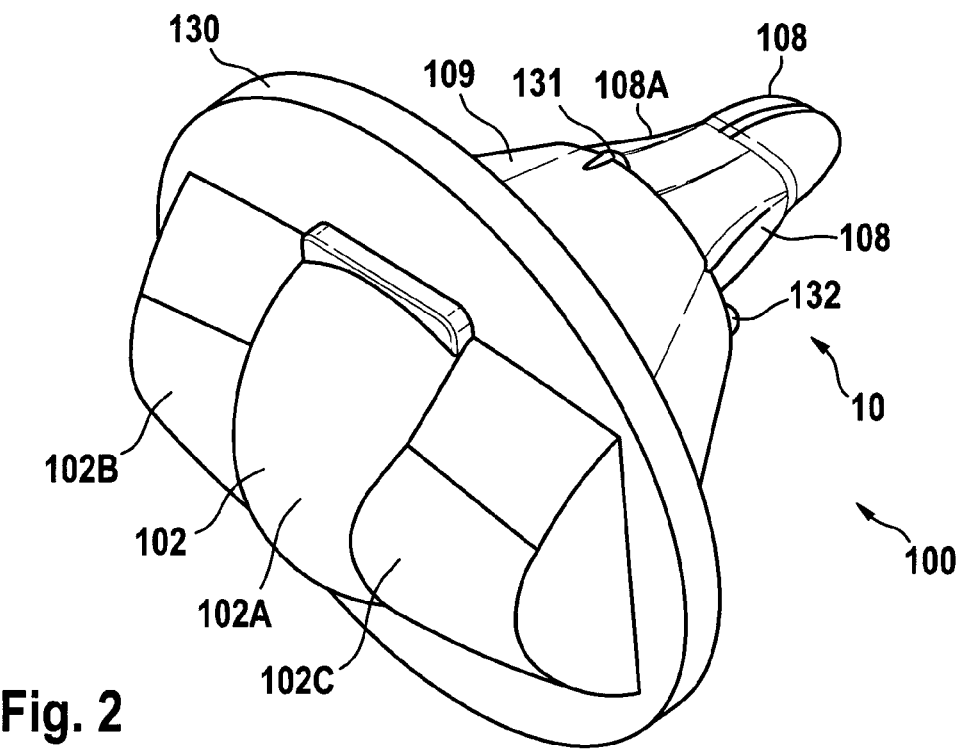
FIG. 2 shows an example of embodiment of a motor vehicle headlamp for implementation in the motor vehicle according to FIG. 1.

FIG. 1 shows an example of embodiment of a motor vehicle 1 including a motor vehicle headlight 10. FIG. 2 shows the motor vehicle headlight 10 including a headlight lens 100 by way of an inclined top view, however, without any housing, fittings and energy supply means, whereas the headlight lens 100 is being shown in FIG. 3 by way of a side view and in FIG. 4 by way of a perspective view, however, also without any housing, fittings and energy supply means. The headlight lens 100 comprises a press-molded monolithic body made from inorganic glass, for example glass comprising 0.2 to 2% by weight $Al_2O_3$,
0.1 to 1% by weight $Li_2O$,
0.3, for example 0.4, to 1.5% by weight $Sb_2O_3$,
60 to 75% by weight $SiO_2$,
3 to 12% by weight $Na_2O$,
3 to 12% by weight $K_2O$, and
3 to 12% by weight CaO.

The press-molded monolithic body comprises a light tunnel 108, which, on its one side, includes a light entry face 101 and, on another side, forms transition into a light passage section 109 (of the press-molded monolithic body) via a bend 107, which light passage section 109 has a segmented light exit face 102, whose segments are designated by reference numerals 102 A, 102 B, 102 C, 102 D and 102 E. The headlight lens 100 is configured such that light entering the headlight lens 100 through the light entry face 101 and, in the region of the bend 107, entering the light passage section from the light tunnel 108, will exit from the light exit face 102 essentially in parallel to the optical axis of the headlight lens 100.

Figure 5:
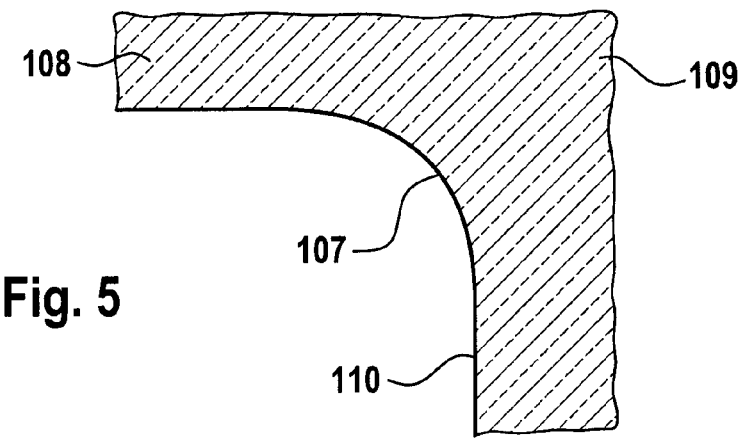
FIG. 5 shows an enlarged representation of a cut-out cross section of a bend for the transition of a light tunnel into a passage section of a headlight lens according to FIG. 3.
Figure 6:
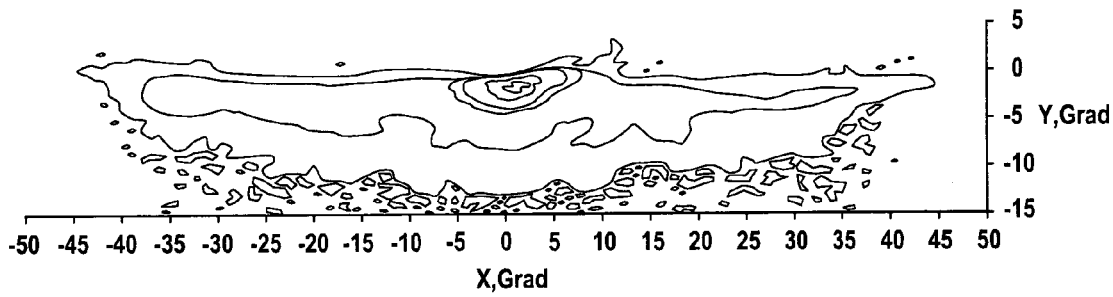
FIG. 6 shows a bright-dark boundary generated via the headlight lens according to FIG. 3.

Herein, the light passage section 109 images the bend 107 as a bright-dark boundary, as is being represented in FIG. 6, wherein, for implementing low beam, via the light source 11, configured as an LED, light is irradiated into or made to enter, respectively, the light entry face 101 of the light tunnel 108. The light tunnel 108 has a transition region 108 A, in which the surface upwardly restricting the light tunnel 108 rises in the direction of the light passage section 109, and in which (transition region 108 A) the surface downwardly restricting the light tunnel 108 extents approximately horizontally or in parallel, respectively, with respect to the optical axis of the headlight lens 100. The motor vehicle headlight 10 may be supplemented by further light sources, as are being disclosed in WO 2012/072188 A1 and WO 2012/072192 A1. By way of an enlarged representation, FIG. 5 shows a cut-out of the bend 107 for transition of the light tunnel 108 into the light passage section 109. The bend 107 is being formed or molded by press-molding and configured in the manner of a continuous, curved transition.

Figure 7:
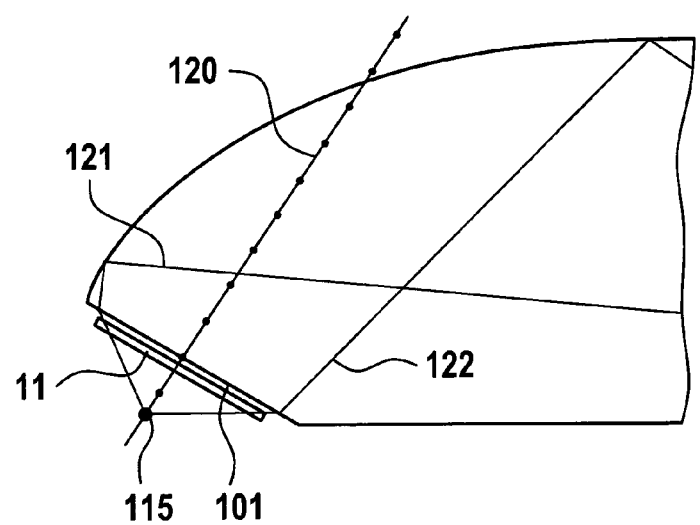
FIG. 7 shows a cut-out representation of a light tunnel of the headlight lens according to FIG. 3, by way of a side view.
Figure 8:
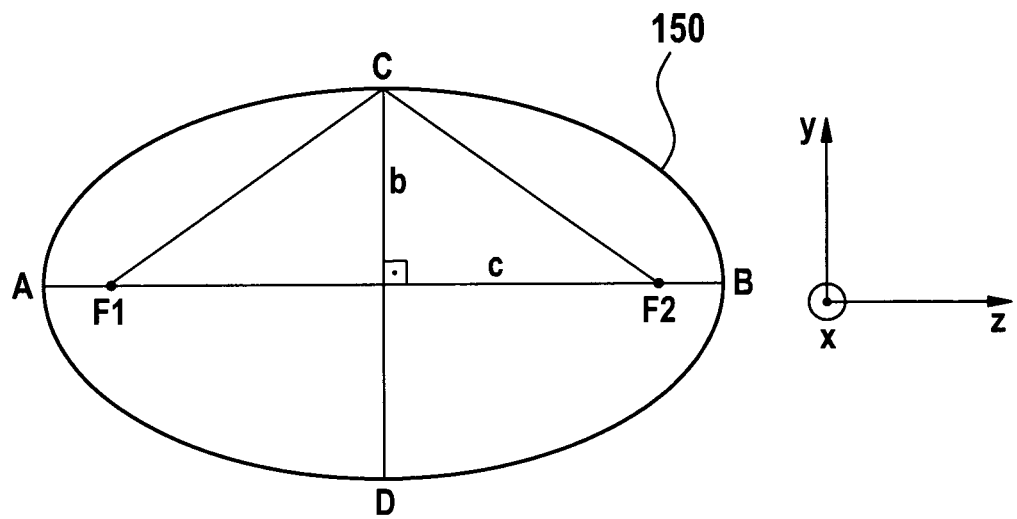
FIG. 8 shows an example of embodiment of an ellipsoid.
Figure 9:
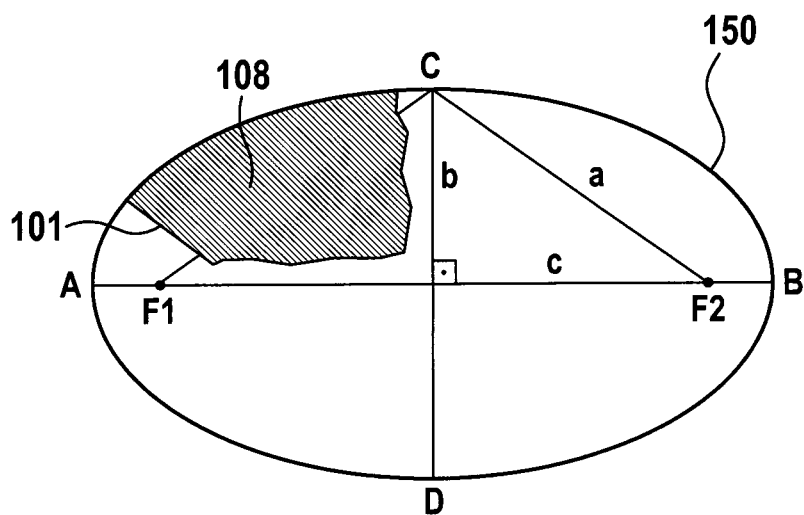
FIG. 9 shows the ellipsoid according to FIG. 8 with a superimposing representation of a portion of the light tunnel represented in FIG. 7, by way of a cross sectional representation.

FIG. 7 shows a sectionally enlarged representation of a part of the light tunnel 108. The upper portion of the part of the light tunnel 108 as shown in FIG. 7 has the configuration of an ellipsoid 150, as is being represented in FIG. 8. For illustrating this configuration even more clearly, a part of the cross-section of the longitudinal segment 171 is shown in FIG. 9 in a manner superimposing (overlaying) the representation of the ellipsoid 150. For the ellipsoid 150 as represented in FIG. 8 the following equation applies:

$$\frac{x^2}{a^2} + \frac{y^2}{b^2} + \frac{z^2}{c^2} - 1 = 0$$

In this equation
z is a coordinate in the direction of the optical axis of the light tunnel (A→B);
x is a coordinate orthogonal with respect to the direction of the optical axis of the light tunnel; and
y is a coordinate orthogonal with respect to the direction of the optical axis of the light tunnel and to the x-direction (D→C).

a, b, and, consequently, c have been selected such that all beams (or rays) of light which pass through focus F1 will concentrate and accumulate again in focus F2 after mirroring in the surface of the ellipsoid. The light beams 121 and 122 depicted in FIG. 7 illustrate the course of the beams of light from the light source 11, which light is irradiated into or made to enter, respectively, the light entry face 101. Reference numeral 120 of FIG. 7 designates the orthogonal of the light entry face 101. Reference numeral 115 designates the mutual point of intersection of the orthogonal 120 of the light entry face 101 with the light beams 121 and 122. The position of this point of intersection 115 corresponds to focus F1 in FIG. 8 and FIG. 9.

Figure 3:
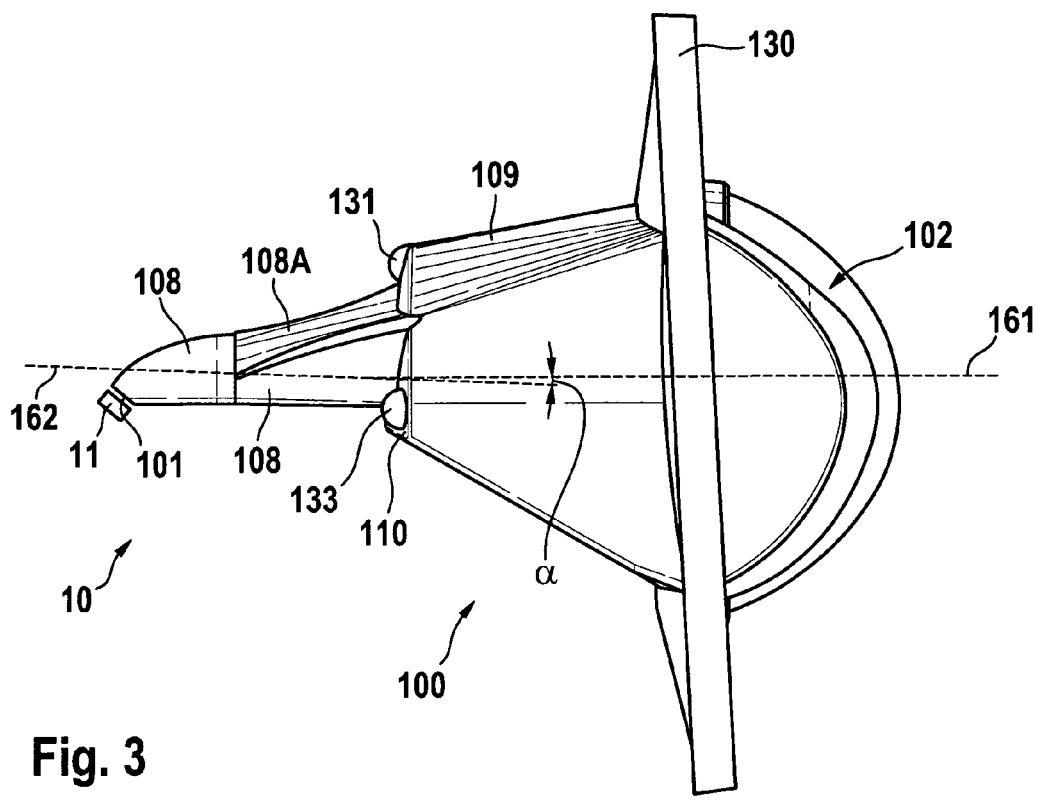
FIG. 3 shows the motor vehicle headlight according to FIG. 2, by way of a side view.

For increasing the light yield, the headlight lens 100 is configured such that a (virtual) straight (line), designated by reference numeral 161 in FIG. 3 intersects a (virtual) straight (line), designated by reference numeral 162 in FIG. 3 by an angle α, which angle, when seen in a clockwise sense, amounts to 1° to 10°, for example 3° to 7°, for example approximately 5°, starting from the first straight (line), wherein the straight (line) 161 is
  the optical axis or an optical axis, respectively, of the light passage section 109 and/or the optical axis or an optical axis, respectively, of the light exit face 102 and/or
  the projection of the optical axis or an optical axis, respectively, of the light passage section 109 onto the vertical plane and/or the projection of the optical axis or an optical axis, respectively, of the light exit face 102 onto the vertical plane,
and wherein the straight (line) 162 is
  the optical axis or an optical axis, respectively, of the light tunnel 108 and/or a straight line through the two focal points F1 and F2 of the ellipsoid 150 and/or
  the projection of the optical axis or an optical axis, respectively, of the light tunnel 108 onto the vertical plane and/or the projection of a straight line through the two focal points F1 and F2 of the ellipsoid 150 onto the vertical plane.

The headlight lens 100 is, herein or thereby, respectively, configured such that the irradiation performance of the light which enters the headlight lens 100 through the light entry face 101 and exits from the light exit face 102, amounts to approximately 90% of the irradiation performance of the light which enters the headlight lens 100 through the light entry face 101.

The headlight lens 100 comprises an alignment structure having three ball-shaped segments 131, 132, and 133, which are arranged on the face 110 of the light passage section 109, which face 110 is facing the light tunnel 108. Via the alignment structure, or the ball-shaped segments 131, 132, 133, respectively, a part of the housing is aligned, which part connects the headlight lens 100 mechanically to the light source 11. In this manner, the light source 11 and the light entry face 101 are aligned precisely with respect to each other. The headlight lens 100, furthermore, comprises a circumferential flange 130. It can be provided for that the headlight lens 100 is also affixed within the housing via the flange 130.

Figure 4:
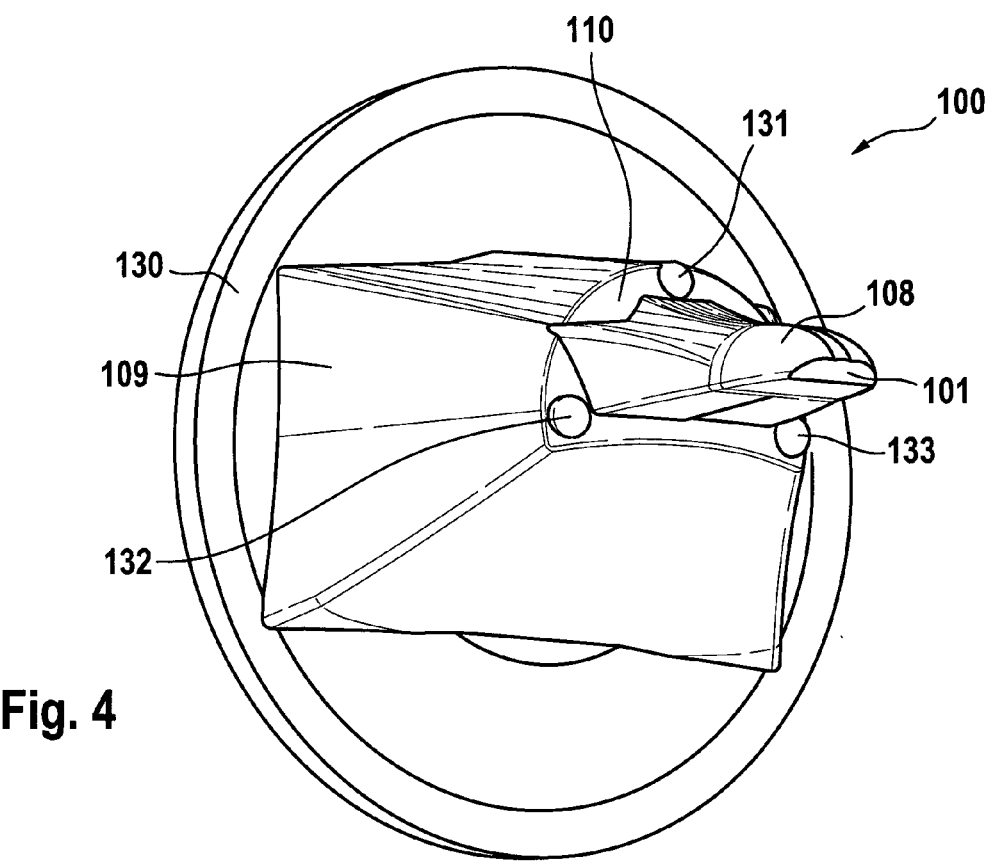
FIG. 4 shows a headlight lens for a motor vehicle headlight according to FIG. 3, by way of a perspective rear view.
Figure 10:
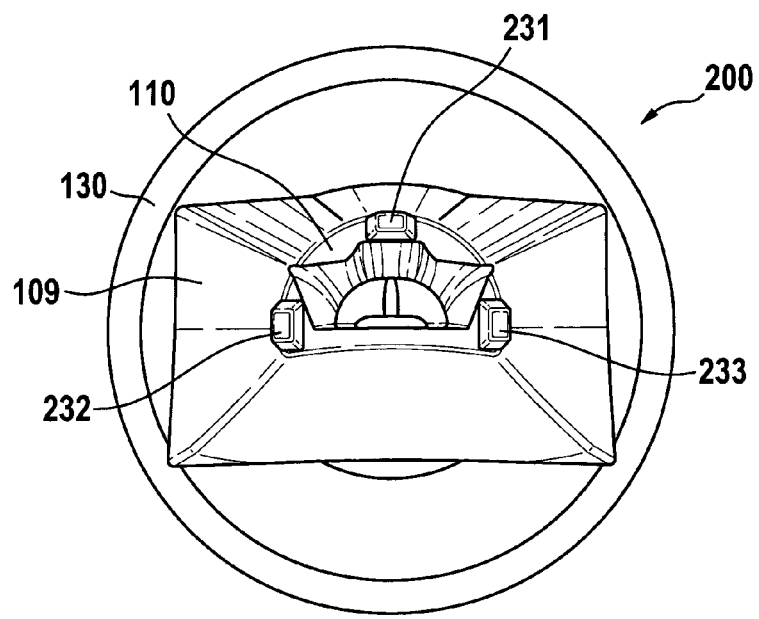
FIG. 10 shows an example of embodiment of a headlamp lens for alternative implementation instead of the headlamp lens according to FIG. 3, by way of a view from the rear.
Figure 11:
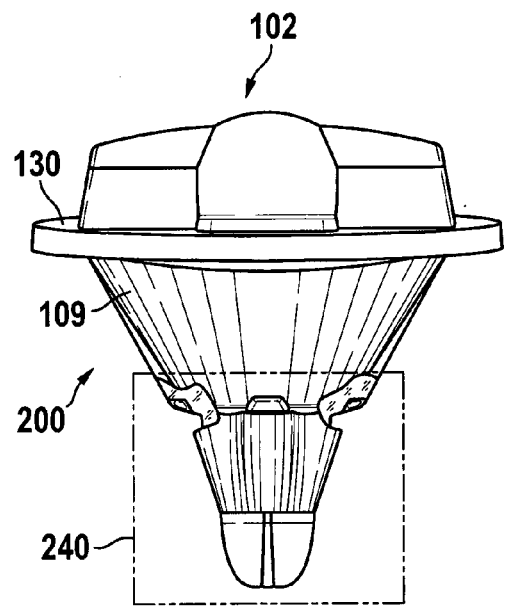
FIG. 11 shows the headlight lens according to FIG. 10, by way of a top view.
Figure 12:
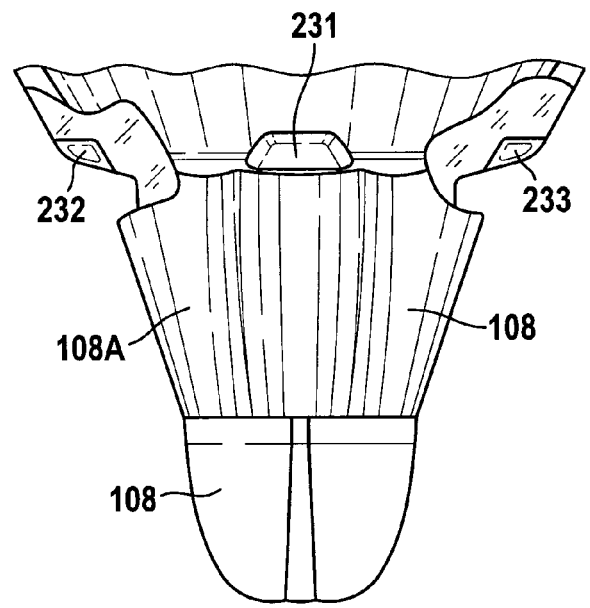
FIG. 12 shows an enlarged representation of the-out of FIG. 11.

FIG. 10 shows a headlight lens 200 for alternative implementation instead of the headlight lens 100, via a rear view, wherein same reference numerals as have been used in FIG. 2, FIG. 3, and FIG. 4 designate same or similar elements, respectively. FIG. 11 shows a headlight lens 200 by way of a top view. FIG. 12 shows, by way of an enlarged representation, cut-outs designated by reference numeral 240 in FIG. 11. The headlight lens 200 comprises, at the transitional area between the light passage section 109 and the light tunnel 108, an alignment structure implemented by three inclined faces 231, 232, 233 as an alternative with regard to the alignment structure of headlight lens 100.

Figure 13:
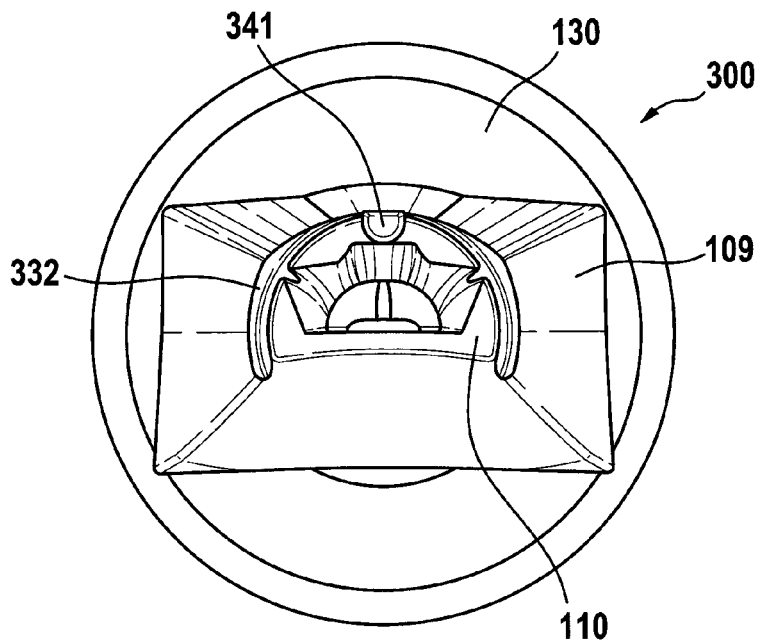
FIG. 13 shows an example of embodiment of a headlight lens for alternative implementation instead of the headlamp lens according to FIG. 3, by way of a view from the rear.
Figures 14, 15:
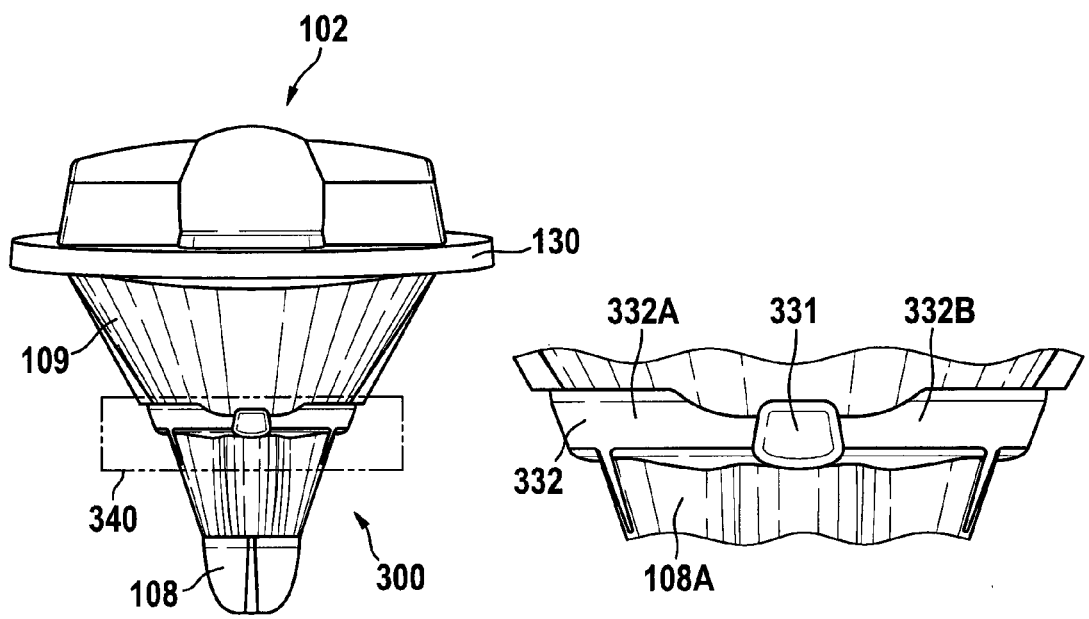
FIG. 14 shows the headlight lens according to FIG. 13, by way of a top view.
FIG. 15 shows a cut-out of FIG. 14, by way of an enlarged representation.

Via a rear view, FIG. 13 shows a headlight lens 300 for alternative implementation instead of the headlight lens 100, in which context same reference numerals as have been used in FIG. 2, FIG. 3, and FIG. 4 designate same or similar elements, respectively. FIG. 14 shows the headlight lens 300 by way of a top view. FIG. 15 shows, by way of an enlarged representation, a cut-out designated by reference numeral 340 in FIG. 14. The headlight lens 300 comprises an alignment structure including a partially circumferential cone 332, which, at its apex, is interrupted by a notch 331, and so that the cone 332 comprises two portions 332A and 332B.

Figure 16:
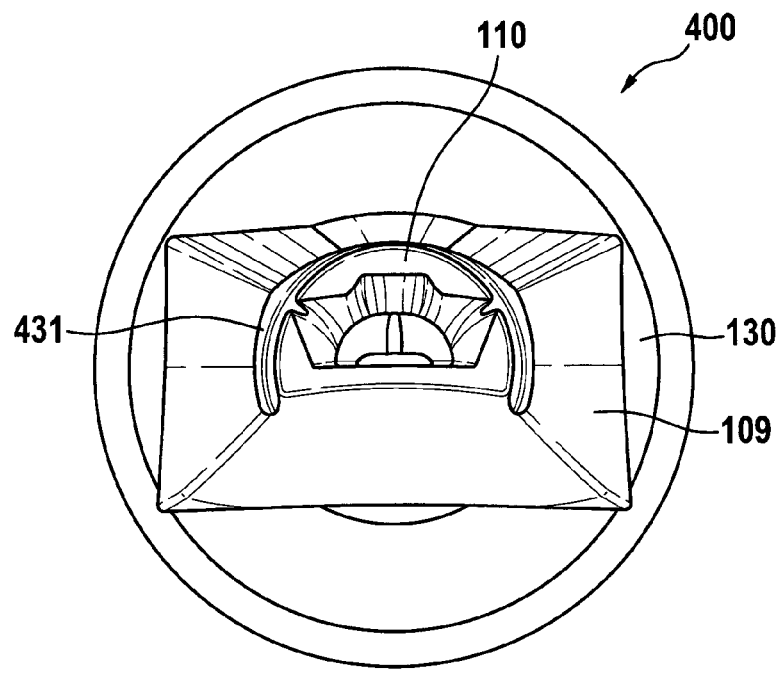
FIG. 16 shows an example of embodiment of a headlight lens for alternative implementation instead of the headlamp lens according to FIG. 3, by way of a view from the rear.
Figure 17:
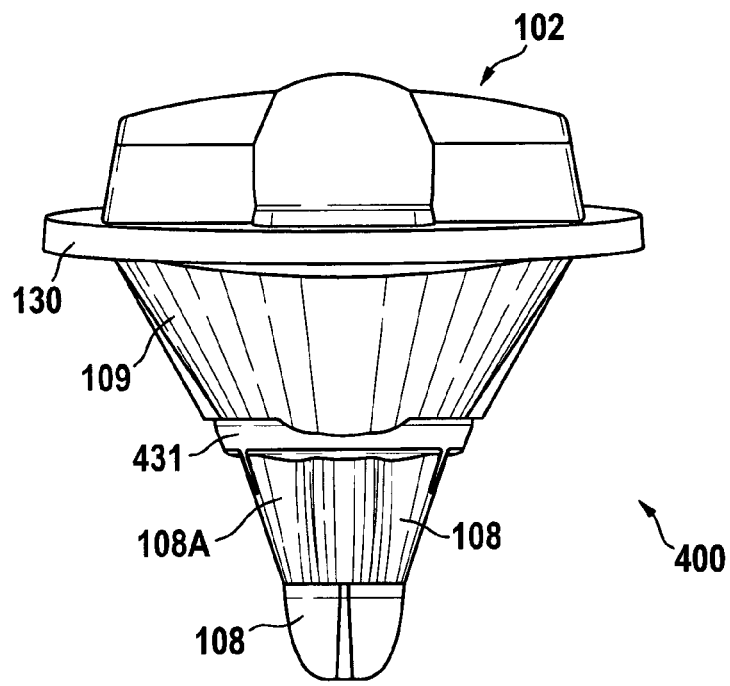
FIG. 17 shows the headlight lens according to FIG. 16, by way of a top view.

Via a rear view, FIG. 16 shows a headlight lens 400 for alternative implementation instead of the headlight lens 100, in which context same reference numerals as have been used in FIG. 2, FIG. 3, and FIG. 4 designate same or similar elements, respectively. FIG. 17 shows the headlight lens 400 by way of a top view. The headlight lens 400 is a simplified embodiment in respect of the headlight lens 300 and comprises an alignment structure which is implemented via a partially circumferential cone 431.

Figure 18:
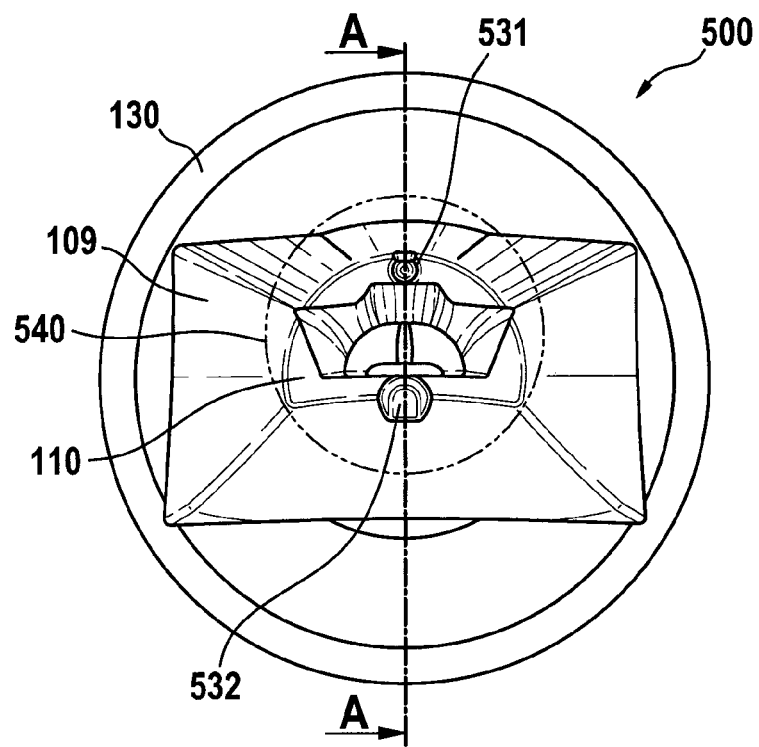
FIG. 18 shows an example of embodiment of a headlight lens including for alternative implementation instead of the headlamp lens according to FIG. 3, by way of a view from the rear.
Figure 19:
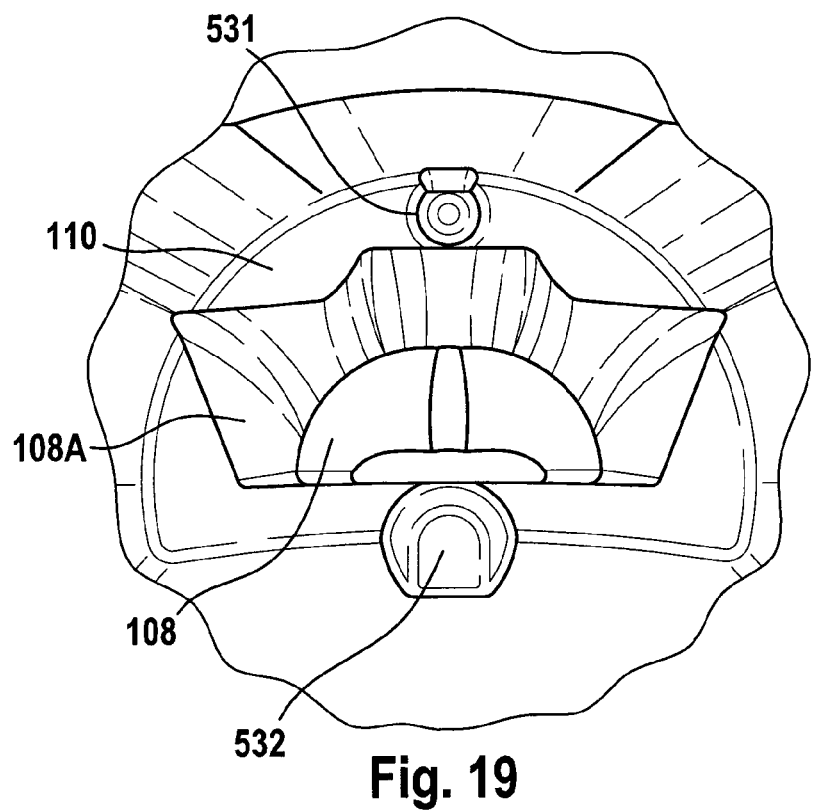
FIG. 19 shows a cut-out of FIG. 18, by way of an enlarged representation.
Figure 20:
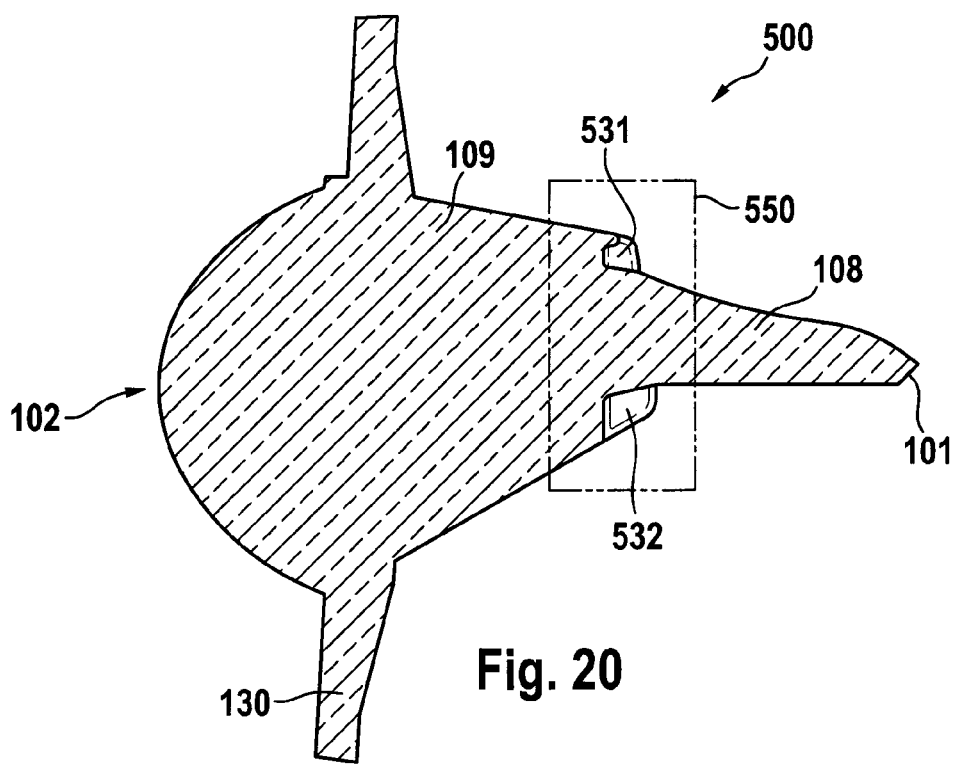
FIG. 20 shows a sectional representation of the headlight lens according to FIG. 18.
Figure 21:
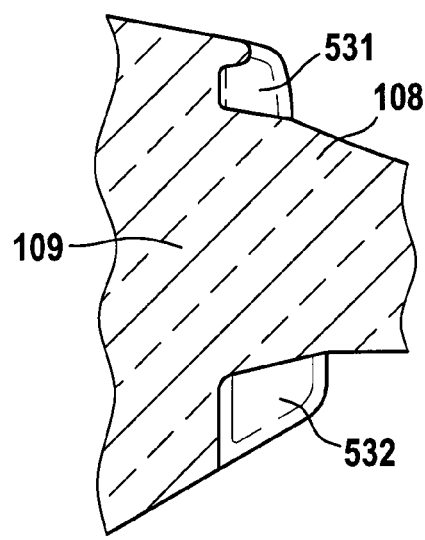
FIG. 21 shows a cut-out of FIG. 20, by way of an enlarged representation.

Via a rear view, FIG. 18 shows a headlight lens 500 for alternative implementation instead of the headlight lens 100, in which context same reference numerals as have been used in FIG. 2, FIG. 3, and FIG. 4 designate same or similar elements, respectively. The headlight lens 500 comprises an alignment structure, which comprises an alignment bore 531 tapering conically, and an alignment face 532. FIG. 20 shows a sectional representation of the headlight lens 500 taken along the sectional line A-A in FIG. 18. FIG. 21 shows an enlarged representation of a cut-out of FIG. 20, in which said cut-out has been designated by reference numeral 550.

The invention claimed is:

1. A headlight lens for a vehicle headlight, the headlight lens including a body of transparent material, the body comprising:
  at least one light entry face,
  at least one optically effective light exit face,
  a light passage section, a light tunnel which, via a bend, transits into the light passage section configured for imaging the bend as a bright-dark-boundary, and an alignment structure configured for aligning the headlight lens in a vehicle headlight, the alignment structure being arranged on a surface of the light passage section facing the light tunnel.

2. The headlight lens as claimed in claim 1, wherein the alignment structure comprises at least one ball-shaped segment.

3. The headlight lens as claimed in claim 1, wherein the alignment structure comprises at least three ball-shaped segments.

4. The headlight lens as claimed in claim 1, wherein the alignment structure comprises at least one cone.

5. The headlight lens as claimed in claim 1, wherein the alignment structure comprises at least one of the group consisting of at least one bore, at least one hole, and at least one notch.

6. The headlight lens as claimed in claim 1, wherein the alignment structure comprises at least one dent.

7. The headlight lens as claimed in claim 1, wherein a first virtual straight line intersects a second virtual straight line by an angle, which angle, when viewing the headlight lens such that the light passage section lies to the right of the light tunnel, amounts to 1° to 10° seen in a clockwise sense starting from the first virtual straight line, wherein the first virtual straight line is one of the group consisting of
an optical axis of the light passage section,
an optical axis of the light exit face,
a projection of the optical axis of the light and passage section onto a vertical plane, and
a projection of the optical axis of the light exit face onto the vertical plane, and
wherein the second virtual straight line is one of the group consisting of
an optical axis of the light tunnel, and
a projection of the optical axis of the light tunnel onto the vertical plane.

8. The headlight lens as claimed in claim 1, wherein the light exit face comprises at least two segments, which are separated from each other via an indentation.

9. The headlight lens as claimed in claim 1, wherein the light tunnel comprises an area on its surface which essentially corresponds to part of the surface of an ellipsoid, and wherein a first virtual straight line intersects a second virtual straight line by an angle, which angle, when viewing the headlight lens such that the light passage section lies to the right of the light tunnel, amounts to 1° to 10° seen in a clockwise sense starting from the first virtual straight line, wherein the first virtual straight line is one of the group consisting of
an optical axis of the light passage section,
an optical axis of the light exit face,
a projection of the optical axis of the light and passage section onto a vertical plane, and
a projection of the optical axis of the light exit face onto the vertical plane, and
wherein the second virtual straight line is one of the group consisting of
a virtual straight line through the two focal points of the ellipsoid and
a projection of the virtual straight line through the two focal points of the ellipsoid onto the vertical plane.

10. A vehicle headlight having a headlight lens and a light source, the headlight lens including a monolithic body of transparent material, the monolithic body comprising:
at least one light entry face,
at least one optically effective light exit face,
a light passage section,
a light tunnel which, via a bend, transits into the light passage section configured for imaging the bend as a bright-dark-boundary, and
an alignment structure configured for aligning the headlight lens with respect to the light source for irradiating light into the light entry face.

11. The headlight as claimed in claim 10, wherein the alignment structure comprises at least one ball-shaped segment.

12. The headlight as claimed in claim 10, wherein the alignment structure comprises at least three ball-shaped segments.

13. The headlight as claimed in claim 10, wherein the alignment structure comprises at least one cone.

14. The headlight as claimed in claim 10, wherein the alignment structure comprises at least one of the group consisting of at least one bore, at least one hole, and at least one notch.

15. The headlight as claimed in claim 10, wherein the alignment structure comprises at least one dent.

16. The headlight as claimed in claim 10, wherein a first virtual straight line intersects a second virtual straight line by an angle, which angle, when viewing the headlight lens such that the light passage section lies to the right of the light tunnel, amounts to 1° to 10° seen in a clockwise sense starting from the first virtual straight line, wherein the first virtual straight line is one of the group consisting of
an optical axis of the light passage section,
an optical axis of the light exit face,
a projection of the optical axis of the light and passage section onto a vertical plane, and
a projection of the optical axis of the light exit face onto the vertical plane, and
wherein the second virtual straight line is one of the group consisting of
an optical axis of the light tunnel, and
a projection of the optical axis of the light tunnel onto the vertical plane.

17. The headlight as claimed in claim 10, wherein the light tunnel comprises an area on its surface which essentially corresponds to part of the surface of an ellipsoid, and wherein a first virtual straight line intersects a second virtual straight line by an angle, which angle, when viewing the headlight lens such that the light passage section lies to the right of the light tunnel, amounts to 1° to 10° seen in a clockwise sense starting from the first virtual straight line, wherein the first virtual straight line is one of the group consisting of
an optical axis of the light passage section,
an optical axis of the light exit face,
a projection of the optical axis of the light and passage section onto a vertical plane and
a projection of the optical axis of the light exit face onto the vertical plane, and
wherein the second virtual straight line is one of the group consisting of
a virtual straight line through the two focal points of the ellipsoid and
a projection of the virtual straight line through the two focal points of the ellipsoid onto the vertical plane.

18. The headlight as claimed in claim 10, the headlight lens further comprising a flange.

19. The headlight as claimed in claim 18, the flange, at least partially, surrounding the light passage section.

20. The headlight as claimed in claim 18, wherein the flange, at least partially, restricts the light exit face.

21. The headlight as claimed in claim 10, the headlight lens further comprising an alignment structure configured for aligning the headlight lens in a vehicle headlight.

22. A headlight lens for a vehicle headlight, the headlight lens including a body of transparent material, the body comprising:
    at least one light entry face,
    at least one optically effective light exit face,
    a light passage section,
    a light tunnel which, via a bend, transits into the light passage section configured for imaging the bend as a bright-dark-boundary,
    a flange, and
    an alignment structure configured for aligning the headlight lens in a vehicle headlight.

23. The headlight lens as claimed in claim 22, the flange, at least partially, surrounding the light passage section.

24. The headlight lens as claimed in claim 22, wherein the flange, at least partially, restricts the light exit face.

25. The headlight lens as claimed in claim 22, wherein the light exit face comprises at least two segments, which are separated from each other via an indentation.

26. The headlight lens as claimed in claim 22, wherein the alignment structure comprises at least one ball-shaped segment.

27. The headlight lens as claimed in claim 22, wherein the alignment structure comprises at least three ball-shaped segments.

28. The headlight lens as claimed in claim 22, wherein the alignment structure comprises at least one cone.

29. The headlight lens as claimed in claim 22, wherein the alignment structure comprises at least one of the group consisting of at least one bore, at least one hole, and at least one notch.

30. The headlight lens as claimed in claim 22, wherein the alignment structure comprises at least one dent.

31. The headlight lens as claimed in claim 22, the body of transparent material being monolithic, wherein the alignment structure comprises at least one ball-shaped segment, at least one dent, at least one cone, at least one of the group consisting of at least one bore, at least one hole, and at least one notch.

32. The headlight lens as claimed in claim 31, wherein a first virtual straight line intersects a second virtual straight line by an angle, which angle, when viewing the headlight lens such that the light passage section lies to the right of the light tunnel, amounts to 1° to 10° seen in a clockwise sense starting from the first virtual straight line,
    wherein the first virtual straight line is one of the group consisting of
        an optical axis of the light passage section,
        an optical axis of the light exit face,
        a projection of the optical axis of the light and passage section onto a vertical plane, and
        a projection of the optical axis of the light exit face onto the vertical plane, and
    wherein the second virtual straight line is one of the group consisting of
        an optical axis of the light tunnel, and
        a projection of the optical axis of the light tunnel onto the vertical plane.

33. The headlight lens as claimed in claim 31, wherein the light tunnel comprises an area on its surface which essentially corresponds to part of the surface of an ellipsoid, and wherein a first virtual straight line intersects a second virtual straight line by an angle, which angle, when viewing the headlight lens such that the light passage section lies to the right of the light tunnel, amounts to 1° to 10° seen in a clockwise sense starting from the first virtual straight line,
    wherein the first virtual straight line is one of the group consisting of
        an optical axis of the light passage section,
        an optical axis of the light exit face,
        a projection of the optical axis of the light and passage section onto a vertical plane and
        a projection of the optical axis of the light exit face onto the vertical plane, and
    wherein the second virtual straight line is one of the group consisting of
        a virtual straight line through the two focal points of the ellipsoid and
        a projection of the virtual straight line through the two focal points of the ellipsoid onto the vertical plane.

\* \* \* \* \*